(12) United States Patent
Lin et al.

(10) Patent No.: US 8,942,091 B2
(45) Date of Patent: Jan. 27, 2015

(54) METHOD AND APPARATUS FOR NOTIFYING ACCESS CONTROL INFORMATION

(71) Applicant: Industrial Technology Research Institute, Hsinchu (TW)

(72) Inventors: Jung-Mao Lin, Taichung (TW); Chun-Yuan Chiu, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/658,801

(22) Filed: Oct. 23, 2012

(65) Prior Publication Data

US 2013/0115913 A1    May 9, 2013

Related U.S. Application Data

(60) Provisional application No. 61/557,424, filed on Nov. 9, 2011.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(Continued)

(52) U.S. Cl.

CPC ............ *H04W 48/08* (2013.01); *H04W 68/025* (2013.01)

USPC ............ 370/230; 370/229; 370/236; 455/453

(58) Field of Classification Search

CPC ...... H04W 28/08; H04W 28/10; H04W 68/00
USPC .......... 455/410–411, 453, 458; 370/229, 230, 370/230.1, 236

See application file for complete search history.

(56) References Cited

U.S. PATENT DOCUMENTS 8,588,792 B2 *  11/2013  Lee et al. ...................... 455/445
8,718,664 B2 *   5/2014  Aoyagi et al. .............. 455/452.1

(Continued)

OTHER PUBLICATIONS

3GPP, "3rd Generation Partnership Project;Technical Specification Group Radio Access Network; Study on RAN Improvements for Machine-type Communications;(Release 11)," 3GPP TR 37.868 V11.0.0, Sep. 2011, pp. 1-28.

(Continued)

*Primary Examiner* — Magdi Elhag
(74) *Attorney, Agent, or Firm* — Jianq Chyun IP Office

(57) ABSTRACT

A method and an apparatus for notifying activations of extended access barring (EAB) and updates of EAB information in the field of Long Term Evolution (LTE) wireless communication systems have been proposed. In accordance with the present disclosure, the eNB notifies MTC devices of EAB changes from a paging message through the paging channel (PCH). The network could use either a single bit EAB status indicator to notify whether the EAB has been enabled or disabled or use multiple bits EAB indicator to represent different EAB parameter changes in addition to whether the EAB has been enabled or disabled. Based on the present disclosure, the network could reduce the paging overhead by require the MTC device to acquire the EAB-SIB only when it needs the EAB information.

19 Claims, 7 Drawing Sheets

(51) Int. Cl.
*H04W 48/08* (2009.01)
*H04W 68/02* (2009.01)

(56) References Cited

U.S. PATENT DOCUMENTS

| | | |
|---|---|---|
| 2009/0270104 A1 | 10/2009 | Du et al. |
| 2009/0318128 A1 | 12/2009 | Narasimha et al. |
| 2010/0215030 A1* | 8/2010 | Agrawal et al. ............... 370/343 |
| 2010/0240377 A1 | 9/2010 | De Pasquale et al. |
| 2011/0182177 A1 | 7/2011 | Sedlacek et al. |
| 2011/0199905 A1 | 8/2011 | Pinheiro et al. |
| 2011/0201307 A1 | 8/2011 | Segura |
| 2011/0235558 A1 | 9/2011 | Diachina et al. |
| 2011/0244907 A1 | 10/2011 | Golaup et al. |
| 2011/0269473 A1 | 11/2011 | Ronneke et al. |
| 2011/0287765 A1 | 11/2011 | Russell et al. |
| 2011/0292893 A1 | 12/2011 | Lee et al. |
| 2011/0302310 A1 | 12/2011 | Diachina et al. |
| 2012/0155257 A1* | 6/2012 | Tiwari ............................ 370/230 |
| 2012/0250501 A1* | 10/2012 | Lee ................................ 370/229 |
| 2012/0282965 A1* | 11/2012 | Kim et al. ..................... 455/515 |
| 2013/0044596 A1* | 2/2013 | Zhi et al. ....................... 370/230 |
| 2013/0051325 A1* | 2/2013 | Ryu et al. ...................... 370/328 |
| 2013/0077484 A1* | 3/2013 | Zhao et al. .................... 370/230 |
| 2013/0095863 A1* | 4/2013 | Dhanda et al. ................ 455/458 |

OTHER PUBLICATIONS

ZTE, "Update of EAB parameters," 3GPP TSG-RAN WG2 75bis, Oct. 10-14, 2011, pp. 1-4.
Hisilicon Huawei, "The necessity of fast EAB," 3GPP TSG-RAN WG2 Meeting 75bis, Oct. 10-14, 2011, pp. 1/3-3/3.
Catt, "Further Considerations on EAB Transmission Mechanism," 3GPP TSG-RAN WG2 Meeting 75bis, Oct. 10-14, 2011, pp. 1-4.
Samsung, "Approach for EAB notification," 3GPP TSG-RAN WG2 75bis, Oct. 10-14, 2011, pp. 1-4.
Itri, "Discussion on EAB information update and acquisition," 3GPP TSG-RAN WG2 75bis, Oct. 10-14, 2011, pp. 1/4-4/4.
Rapporteur (Huawei), "[75b#31]—Joint: SIB update mechanism for EAB," 3GPP TSG-RAN WG2 meeting 76, Nov. 14-18, 2011, pp. 1-13.
Itri, "Further discussion on ETWS-like notification for fast EAB update mechanism," 3GPP TSG-RAN WG2 77, Feb. 6-10, 2012, pp. 1/5-5/5.
ZTE, "EAB information update procedure," 3GPP TSG-RAN WG2 77, Feb. 6-10, 2012, pp. 1/4-4/4.
Catt, "Further analysis on EAB update mechanisms," 3GPP TSG-RAN WG2 Meeting 77, Feb. 6-10, 2012, pp. 1-6.
Huawei, "Revised SID: RAN Improvements for Machine-type Communications," 3GPP TSG-RAN 47, Mar. 16-19, 2010, pp. 1-6.

* cited by examiner

METHOD AND APPARATUS FOR NOTIFYING ACCESS CONTROL INFORMATION

CROSS REFERENCE TO RELATED APPLICATION

This application claims the priority benefit of U.S.A. provisional application Ser. No. 61/557,424, filed on Nov. 9, 2011. The entirety of the above-mentioned patent application is hereby incorporated by reference herein and made a part of specification.

BACKGROUND

1. Technical Field

The present disclosure generally relates to a method and an apparatus for notifying activations of extended access barring (EAB) and updates of EAB information in the field of Long Term Evolution (LTE) wireless communication systems.

2. Related Art

Machine Type Communication (MTC) is a novel communication technique among machines and often involves communications either with very limited human interventions or completely without. Implementations of MTCs may be evident in the practical applications such as metering, transportation, health care system, remote maintenance, and etc.

The MTC has several characteristics: First of all, the population density of MTC devices is generally much higher than human to human (H2H) communication devices. Second of all, MTC devices are usually considered to have lower communication priority than H2H devices. Third of all, the MTC devices can be behaviorally unpredictable as they may not exhibit a regular pattern as to when they may require network resources. Based on these three characteristics, if an enormous quantity of MTC devices attempt to attach to a network, the MTC devices would easily consume all the network resources and cause overloading to the network. In order to prevent network congestions or overloading, a measure to curtail this type of problem is required.

For the 3$^{rd}$ Generation Partnership Project (3GPP) Long Term Evolution (LTE) communication system, the Extended Access Barring (EAB) scheme has been introduced to prevent congestion or overload in the Radio access network (RAN) or in the Core Network (CN). EAB is a mechanism for which random access (RA) attempts from MTC devices can be controlled. In LTE, each user equipment (UE) may be classified into one of the Access Classes (AC) between 0 to 9. When a LTE resource channel, the Physical Random Access Channel (PRACH), is too congested, the EAB scheme could mitigate PRACH congestion by barring some ACs of MTC devices from accessing the network. EAB parameters are located in the System Information Blocks (SIBs) of the System Information (SI) which is broadcasted periodically by the LTE Network through the Broadcast Control Channel (BCCH). Since the EAB parameters are treated as a kind of System Information (SI) in LTE, it would need to be updated within the SI according to a prescribed updating mechanism. However, the prescribed SI updating mechanism possesses shortcomings in which the updating mechanism is rendered ineffective in coping with the network overload problem.

Specifically, the SI in LTE cannot be modified at any time. Only at each Modification Period Boundary (MPB) would the SI be allowed to be modified. Supposedly if the MPB is set to be 640 milliseconds (ms), the SI would then only be allowed itself to be modified once every 640 ms. Based on the MTC characteristics as previously mentioned, if an enormous quantity of MTC devices were to perform RA attempts, the EAB scheme cannot be enacted soon enough to curtail PRACH overloads since the EAB parameters cannot be immediately updated according to the currently prescribed updating mechanism.

To order to circumvent the restriction caused by the MPB, two main schools of thoughts have been proposed for LTE. The first proposed method is mandate reading of the EAB information for each MTC before an access. The second proposed method is notification of EAB information update through paging.

For the first proposed method, the network would not be restricted by the MPB as the network could update the EAB parameters any time at any EAB-SIB, the specific system information block of the SIBs which contains the EAB System Information. The network could update the EAB parameters without any notifications to the MTC devices. However, the MTC devices would be required to obtain the EAB-SIB before any attempts to access the network.

For the second proposed method, the network also would not be restricted by the MPB as the EAB information could be updated any time at any EAB-SIB. The difference from the first proposed method is that the network is required to notify the change of EAB parameters through paging, which means that the MTC would be paged by the network paging channel. For the second proposed method, any EAB status change would trigger the network to send a paging message containing an EAB change notification. The EAB status change may include the EAB enable, any EAB parameters change, or the EAB disable. When the EAB status change is detected from a paging message, the MTC would only know that the EAB status has been changed through being able to distinguish what kind of change has been implemented. Therefore, in order to acquire the latest EAB status, any MTC device which receives the page containing the EAB change notification would be requested to acquire the EAB-SIB immediately.

For example, if the EAB is enabled by a base station (BS) or eNodeB (eNB), a paging message containing EAB change indicator which equals true would be transmitted to any MTC device within a receiving range. When the paging message is received by a MTC device, the EAB-SIB would immediately be acquired. If the EAB parameter is changed by an eNB, a paging message containing EAB change indicator which equals true would also be transmitted to any MTC device within a receiving range and caused the MTC devices to acquire the EAB-SIB. Similarly, if the EAB is disabled by an eNB, a paging message containing EAB change indicator which equals true would also be transmitted to any MTC device within a receiving range and caused the MTC devices to acquire the EAB-SIB. But if a normal paging, meaning paging not involving EAB, is made, the EAB change indicator would equal false, since the EAB change indicator would only indicate a EAB status change.

Comparing both proposed update mechanisms, the first proposed method has an advantage of being able to modify the EAB information without having to first notify MTC devices. The other advantage is that there would be no impact on H2H UEs and on MTC devices which do not attempt to access the network. However, the disadvantage is that the MTC devices would have to acquire EAB-SIB whenever they perform a RA to the network. Since EAB might be a relatively rare event, the MTC devices would consume power needlessly only to find out that the EAB has not been enacted. Also acquiring the EAB information before RA attempt would cause some degrees of synchronous access problem which will happen after MTC devices acquire EAB-SIB and discover that the EAB is still disabled or discover that they are not actually barred by the EAB.

On the other hand, for the second proposed method, has an advantage of not causing synchronous access problems and unnecessary SIB acquisitions when EAB is disabled. However, a disadvantage is that there would be a high paging overhead since the network would use paging messages to notify each EAB update to MTC devices, and also the network might change EAB parameters frequently such as to rotate barred access classes or to remove the barring in gradual steps. Also it would not be necessary to require all MTC devices to immediate obtain EAB information after EAB status change has been detected through paging messages because the MTC devices might not actually need the EAB information and also not all MTC devices would want to access the network.

Therefore, since it appears that both the first and the second proposed method are not completely satisfactory, another solution would be required to alleviate the shortcomings of current proposals, such as a solution to resolve the problems of high paging overhead and non-necessary impact on the MTC devices when paging messages are used.

SUMMARY OF THE DISCLOSURE

A method and an apparatus for notifying activations of extended access barring (EAB) and updates of EAB information in the field of Long Term Evolution (LTE) wireless communication systems have been proposed.

The present disclosure directs to a method for performing access control information by barring, adapted to a user equipment (UE), and the method contains the following steps of receiving a paging message which contains an indicator indicating an access control mechanism is activated, acquiring a parameter of the access control mechanism until an access to the wireless communication network is needed, and receiving another paging message which contains an indicator indicating the access control mechanism is disabled.

The present disclosure directs to a method for notifying access control information by barring, adapted to a base station (BS), and the method contains the following steps of activating an access control mechanism, indicating activating the access control mechanism by an indicator in a paging message, disabling the access control mechanism, and indicating disabling the access control mechanism by an indicator in a paging message.

The present disclosure directs to a barred user equipment (UE) which contains at least a transceiver and a processor. The transceiver is configured for transmitting and receiving wireless signals. The processor coupled to the transceiver and configured for receiving a paging message which comprises an indicator indicating whether an access control mechanism is activated or disabled and for acquiring a parameter of the access control mechanism when an access to wireless communication network is needed.

The present disclosure directs to a base station (BS) which contains at least a transceiver and a processor. The transceiver is configured to transmit and receive wireless signals. The processor is coupled to the transceiver and is configured for activating or disabling an access control mechanism for a specific access class and for transmitting a paging message which comprises an indicator indicating whether the access control mechanism is activated or disabled.

The accompanying drawings are included to provide a further understanding of the disclosure and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
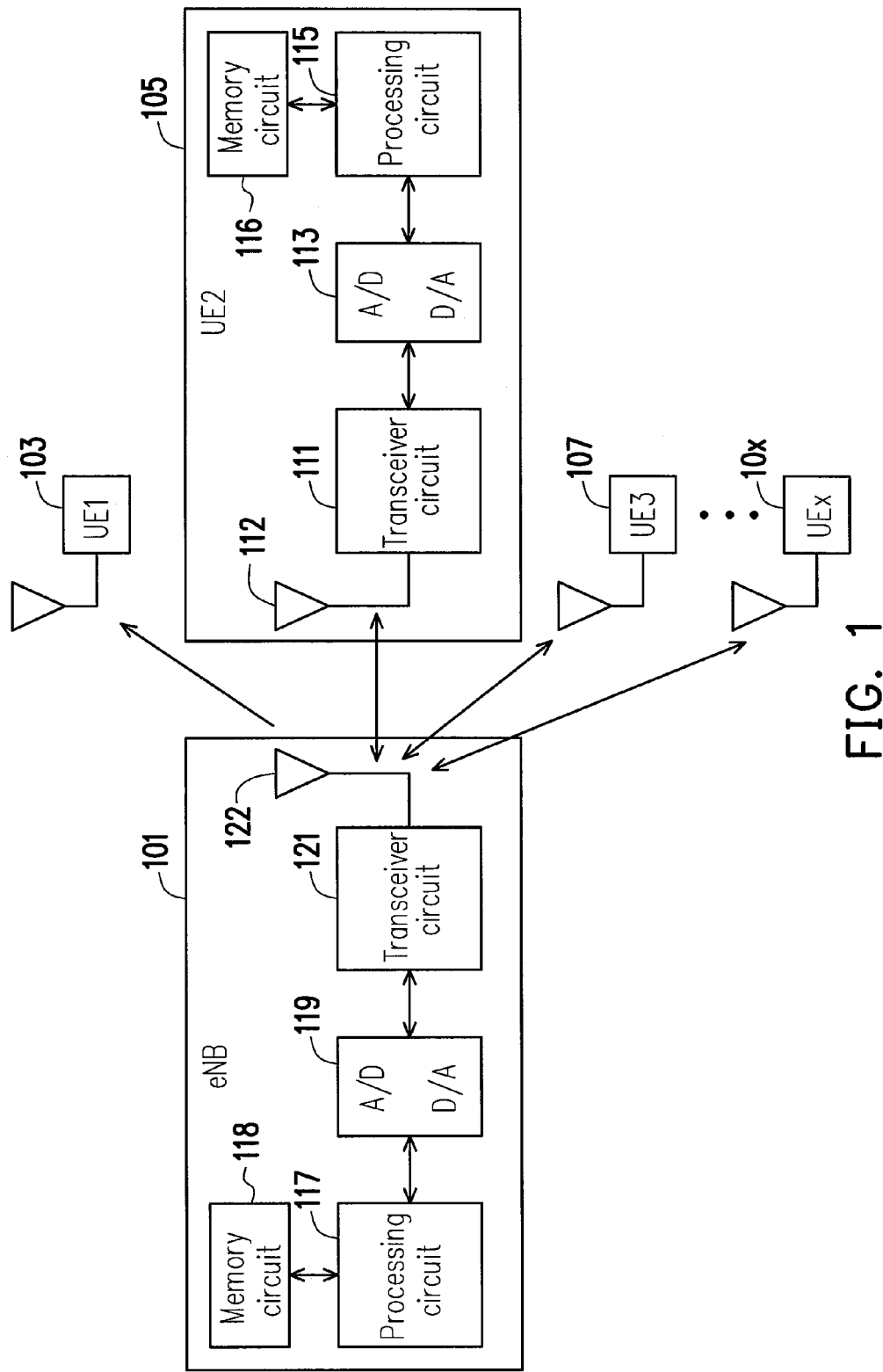
FIG. 1 illustrates the communication system in accordance with an exemplary embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

The term "eNodeB" or "eNB" in this disclosure may be, for example, a base station (BS), a Node-B, an advanced base station (ABS), a base transceiver system (BTS), an access point, a home base station, a relay station, a scatterer, a repeater, an intermediate node, an intermediary, and/or satellite-based communication base stations, and so like.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and so like. In some applications, a UE may be a fixed computer device operating in a mobile environment, such as a bus, train, an airplane, a boat, a car, and so like.

FIG. 1 illustrates a communication system according to an exemplary embodiment. The communication system at least includes an eNodeB (101) in communication with at least one UEs (103, 105, . . . 10x) in accordance with the LTE communication standard. Each UE contains, for example, at least a transceiver circuit (111), an analog-to-digital (A/D)/digital-to-analog (D/C) converter (113), and a processing circuit (115). The transceiver circuitry (111) is capable of transmitting uplink signal and/or receives downlink signal wirelessly. The transceiver circuitry (111) may also perform operations such as low noise amplifying, impedance matching, frequency mixing, up or down frequency conversion, filtering, amplifying, and so like. The transceiver circuitry (111) also includes an antenna unit (117). The analog-to-digital (A/D)/digital-to-analog (D/C) converter (113) is configured to convert from an analog signal format to a digital signal format during downlink signal processing and digital signal format to analog signal format during uplink signal processing. The processing circuit (115) is configured to process digital signal and to perform procedures of the proposed method for data transmission in accordance with exemplary embodiments of the present disclosure. Also, the processing circuit (115) may include a memory circuit (116) to store data or record configurations assigned by the eNB (101). The eNB (101) contains similar elements including a transceiver unit (121) and a analog-to-digital (A/D)/digital-to-analog (D/C) converter (119) which lead to the converted digital signal to be processed by its processing circuitry (117) as well as using the memory circuit (118) so as to implement the method for data transmission in accordance with exemplary embodiments of the present disclosure.

In this disclosure, a method and an apparatus based on FIG. 1 using the same method which notifies access control information (e.g. EAB) based on previously said "notification of EAB information update through paging" is proposed. However, in this disclosure, the network could consume less paging overhead in comparison to the previously said "notification of EAB information update through paging" as only MTC devices which need EAB information would actually try to acquire the EAB-SIB. Accordingly, the proposed notification scheme would consume less paging overhead during the process of notifying the latest EAB status in comparison with conventional method and would more effectively alleviate the overloading of PRACH of the LTE communication system.

The first underlying concept of this present disclosure is for the BS to broadcast through the paging channel (PCH) a paging message which notifies whether the access control mechanism is enabled or disabled and to notify the change of states of the access control mechanism including the specific changes of the EAB parameters. In other words, the paging message would contain specific information which provides EAB update status. The enabling or disabling of the access control mechanism is for a specific access class (e.g. MTC UE with access class 0-9). The access control mechanism would affect MTC devices but not H2H devices. The second underlying concept of this present disclosure is for the MTC devices to decide whether to acquire EAB-SIB not only based on the EAB notification from paging messages but also the current statuses of each MTC device. The first concept and the second concept are to be presented with further detail.

The first variation of the first underlying concepts of this present disclosure is to use a binary indicator in the paging channel through the paging channel (PCH) to notify whether an access control (e.g. EAB) is enabled or disabled in accordance with a current format of the LTE communication systems. For instance, a TRUE or FALSE state (e.g. a first and a second state) represented by a single bit in a paging message could be used to represent whether the EAB has been activated or not. In other words, a paging message would contain an EAB status bit and be broadcasted through the paging channel (PCH). The first state of the EAB status bit could be a one, and the second state of the EAB bit could be a zero and vice versa. When the EAB has been activated, the network would notify MTC devices by broadcasting the EAB status bit equals TRUE through PCH. When the EAB is disabled, the network would notify MTC devices by broadcasting the EAB status bit equals FALSE through PCH.

Figure 2A:
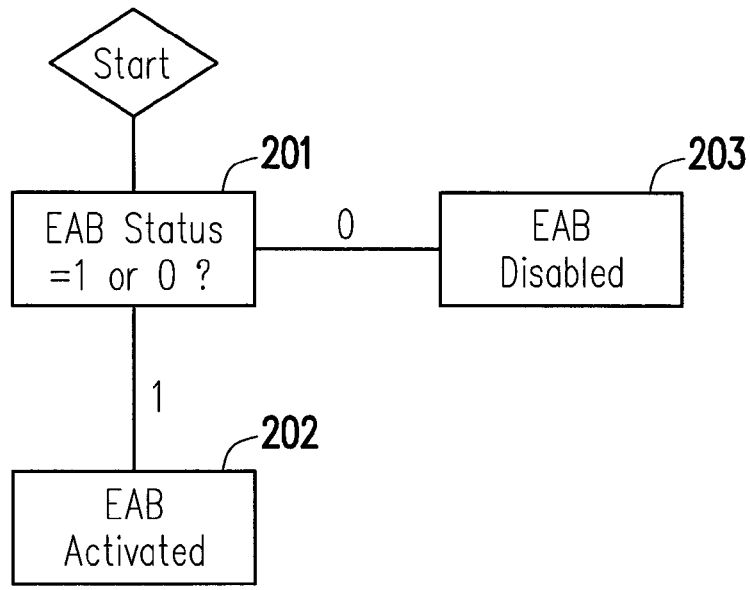
FIG. 2A illustrates the first variation of the first underlying concept of this present disclosure.

FIG. 2A illustrates the first variation of the first underlying concept of this present disclosure. In step 201, if a paging message contains a EAB status equals a TRUE state (e.g. EAB status=1), then in step 202, the EAB is set to be activated by the BS. In step 201, if a paging message contains an EAB status equals a FALSE state (e.g. EAB status=0), then in step 203, the EAB is set to be disabled by the BS.

While the EAB is activated, any EAB parameter change would not trigger the network to send paging messages, which is different from the conventional method. Also, if an other purpose paging (i.e. paging unrelated to EAB) is needed, the network would send the paging messaging containing EAB=TRUE if the EAB is activated. Otherwise, if an other purpose paging is needed while the EAB is disabled, the network would send the paging message containing EAB=FALSE if the EAB is disabled. In this way, the presence of the EAB status bit could provide more information about the EAB status than the conventional method from paging message. Also since any EAB parameter change will not trigger the network to send paging messages, paging overhead can be minimized during the duration of EAB enable or disable.

The second variation of the first underlying concept is to notify not only whether the EAB has been activated or disabled but also to notify whether the EAB parameters have been changed. In order for this concept to be implemented, the network would use multiple EAB indicator bits to represent both the EAB status and subsequent changes to the EAB status.

For instance, if two indicating bits are used, then there could be four possible states. The first state could be 00, and the second, third, and fourth state could be respectively 01 or 10 or 11. If the first state could indicate EAB disabled, then the second, third, and fourth state could indicate that the EAB has been activated. The cyclical changes from the second state, to the third state, to the fourth state, to the second state, and etc could indicate the change of EAB parameters.

For instance, if EAB is disabled, the paging message through the PCH would contain bits 00 which indicates that the EAB status is disabled. If the EAB is activated, the network would notify MTC devices by sending paging messages with the EAB status bits 01 which indicates that the EAB status has been activated. During the duration of the activation of the EAB, if the EAB parameters were to change, the EAB indicating bits could change from 01 to 11 or 10. Therefore, when the EAB information changes after EAB has been activated, the network would send paging message with the EAB indicator=11. The MTC devices would know that the EAB information has bee updated since the EAB indicator has changed from 01 to 11. In this way, the MTC devices could prevent wasting resources to obtain the same EAB information which has not been updated from the duplicate paging messages. The duplicate paging message is for increasing the reliability that the MTC devices would receive the paging message. If the paging message is caused by other purpose paging while the EAB is still activated, the EAB status indicator would remain unchanged. When the EAB is disabled, the network would send the paging message containing the EAB status indicator=00.

Figure 2B:
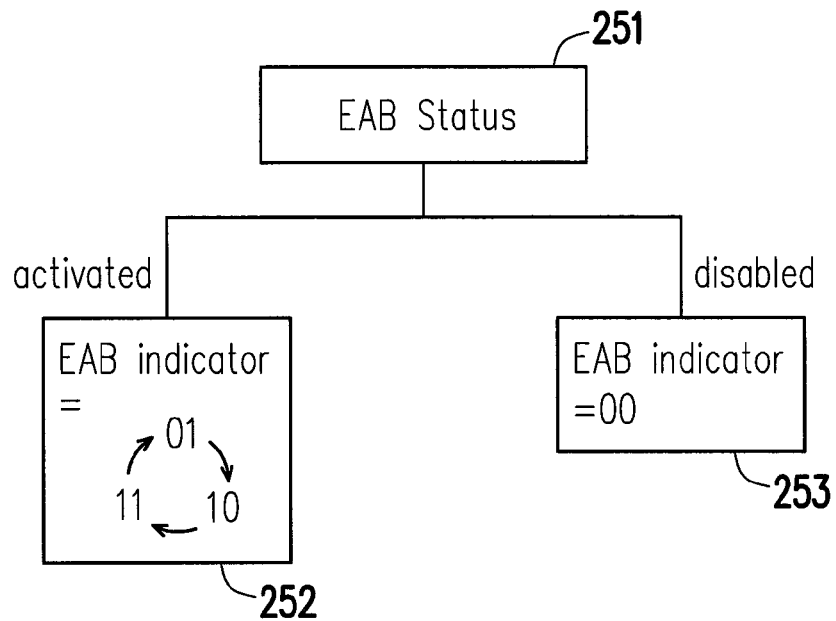
FIG. 2B illustrates the second variation of the first underlying concept of this present disclosure.

FIG. 2B illustrates the second variation of the first underlying concept. In 251, a paging message has been broadcasted by a BS or eNB. The paging message contains information as for whether the EAB has been disabled or activated. If the EAB has been disabled, then the EAB status indicator in the paging message would have been set to be 00. If EAB has been activated, then in 252, the EAB status indicator could be set to any of the 01, 10, or 11 indicating bits. Each time when the EAB information is updated, the indicating bits would cycle among 01, 10, and 11.

For the second underlying concept, MTC devices would decide whether to acquire the EAB-SIB not only based on the EAB notification from paging messages but also decides based on the current status of the MTC devices themselves. In other words, if an MTC device is unbarred, it does not acquire EAB-SIB right away according to the conventional method, bur rather the MTC device would postpone acquiring of the EAB-SIB until it decides to perform random access after receiving the EAB notification from a paging message. If a MTC device finds itself barred by the EAB, the barred MTC device would later acquire the EAB-SIB according to an event trigger, such as the timer trigger or receiving an EAB update notification from another paging message. Based on the first and the second underlying concepts of this present disclosure, two specific embodiments have been proposed.

The first exemplary embodiment is to combined the first variation of the first underlying concept with the second underlying concept, that is for using a binary indicator to notify the whether the EAB has been enabled or disabled through PCH and for a MTC device to decide whether to acquire the EAB-SIB based on its current status.

Figure 3:
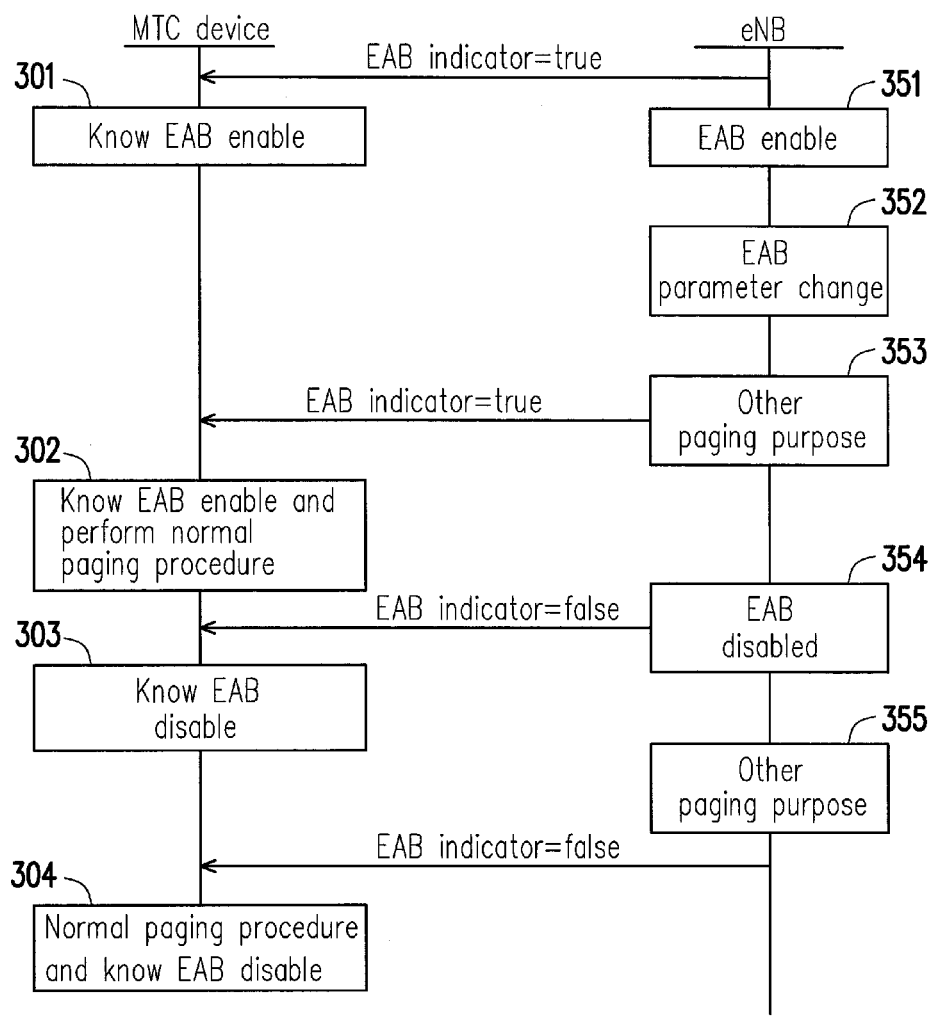
FIG. 3 illustrates the first exemplary embodiment of the present disclosure.

FIG. 3 illustrates the first exemplary embodiment of the present disclosure. Referring to FIG. 3, in 351 when EAB has been enabled or activated, the network would in send a paging message with an EAB status=TRUE indication. As a MTC device detects the EAB=TRUE indication, the MTC would in 301 knows that the EAB has been enabled. For the first embodiment, the MTC stays true to the second underlying concept and does not try to acquire the EAB-SIB right away after receiving the paging message with the EAB status=TRUE indication because it has not yet tried to access the network. Also when the EAB parameter change in 352, the change of the EAB parameter will not trigger the network to send a paging message to notify the MTC devices and therefore saves paging overhead. However, when the network needs to send an other purpose paging in 353 (i.e. normal paging not related to EAB), the network would still include the EAB status=TRUE indication as long as the EAB is still activated. In that case, the paged MTC devices would still know in 302 know that the EAB is enabled and respond to paging as they normally would according to conventional procedures.

When the EAB is disabled as in 354, the network would send a paging message with EAB status=FALSE to the MTC devices. The MTC devices would in 303 know that the EAB has been disabled and would perform access to the network normally. Also as long as the EAB remain disabled, an other purpose paging in 355 would contain in the paging message the EAB status=FALSE indication. The MTC devices would in 304 respond to the page normally according to conventional procedures and at the same time know that the EAB is still disabled.

According to another example of the first embodiment, the change of the EAB status could signal a change in the EAB status. A UE may know that the EAB parameter has changed whenever the indicator changes from the EAB status=TRUE to the EAB status to the FALSE state or vice versa. In another words, the UE could know that the EAB status has changed when the EAB indicator bit changes from 0 to 1 or 1 to 0. Also for this example, if the indicator does not appear in the paging message, then it signifies that the EAB has been disabled. Otherwise, the appearance of the indicator per se in the paging message signifies that the EAB has been activated. The key concept behind this particular example is to use the change of EAB indicator bit in the paging message to signal a change in the EAB parameter. As the EAB parameter has been altered by the base station, the MTC UEs served by the base station would need to fetch and update the EAB parameter contained in the system information.

Figure 4:
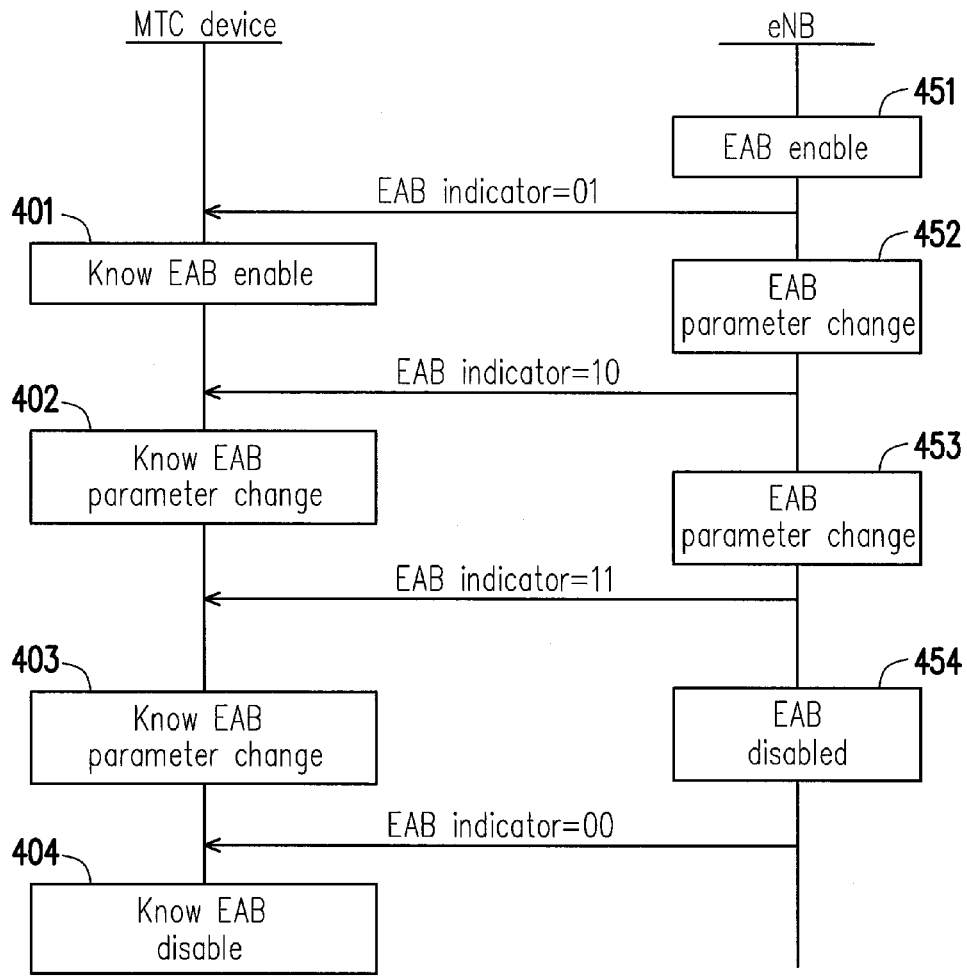
FIG. 4 illustrates the second exemplary embodiment of the present disclosure.

The second exemplary embodiment is to combined the second variation of the first underlying concept with the second underlying concept, that is for using a multi-bits EAB status indicator to notify the whether the EAB has been enabled or disabled and EAB parameters change through PCH and for a MTC device to decide whether to acquire the EAB-SIB based on its current status. FIG. 4 illustrates the second exemplary embodiment of the present disclosure.

Referring to FIG. 4, when EAB is enabled or activated in 451, the network would notify the MTC devices through PCH containing a two bit indicator, EAB status=01 indication. Please note the embodiment is not limited to the exact binary value nor is it limited to only two bits. When the MTC devices receive the EAB status=01 indication from the paging message through PCH, they would know that the EAB has been enabled.

In this exemplary embodiment, a MTC device in general does not yet try to acquire the EAB-SIB after receiving the paging message with the EAB indicator=01 (01 implies EAB=activated) since it has not yet tries to access the network. In 452, when the EAB parameter is altered by the eNB, the eNB would transmit a paging message with the EAB status=10 indication. As a MTC device compares the newly received EAB status indicator with the previous EAB status indicator and realizes the differences between the two, the MTC device in 402 would know that the EAB parameter has bee changed. During the next time when the EAB parameter is altered again, the network would send yet another paging message with the EAB status=11 indication. The paged MTC devices in 403 would know that the EAB parameter has been changed again.

In 454 when EAB has been disabled by the eNB, the eNB would send a paging message with the same indicator containing EAB status=00 indication. MTC devices in 404 would know that the EAB has been disabled.

Once a MTC device tries to access the network after detecting that the EAB status indicating bits inform a status of "enabled" or TRUE, it would first acquire the EAB-SIB before it actually performs a random access procedure. After acquiring the EAB-SIB, if a MTC device finds itself barred by the EAB, the device will wait for a predetermined period and re-acquire the EAB-SIB to check whether itself is still barred by the EAB from the EAB parameters. Note that the predetermined period can be determined by the eNB or the MTC device itself. If the barred device acquires the EAB-SIB and passes the bar by the EAB or finds that the EAB has been disabled entirely, it would wait for another predetermined period and access the network.

Figure 5:
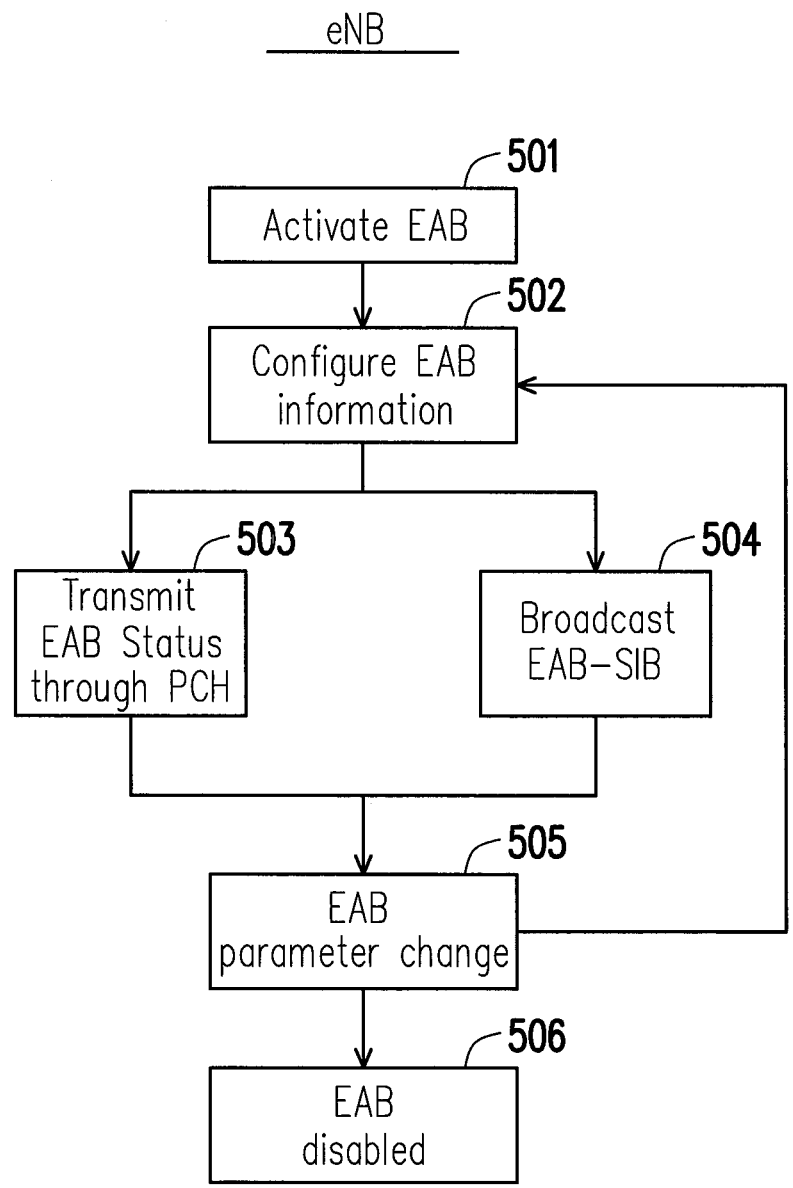
FIG. 5 illustrates the EAB procedure from the point of view of an eNB.

FIG. 5 illustrates the flowchart of notifying the EAB from the point of view of an eNB. Referring to FIG. 5, in 501, the eNB activates the EAB for a specific access class (e.g. for MTC devices). In 502, the eNB configures the EAB parameter in the EAB-SIB as well as configuring the EAB status indicator in the paging message. In 503, the eNB transmits a paging message to inform MTC devices that the EAB has been active. In 504, the eNB also broadcast the EAB-SIB contained in the SI which is broadcasted periodically to MTC devices in range. In 505, the eNB determines whether the EAB information containing EAB parameter or status needs to be changed. If yes, the eNB re-configures the EAB information in 502. Otherwise, the eNB would eventually disable the EAB when it is no longer necessary.

Figure 6:
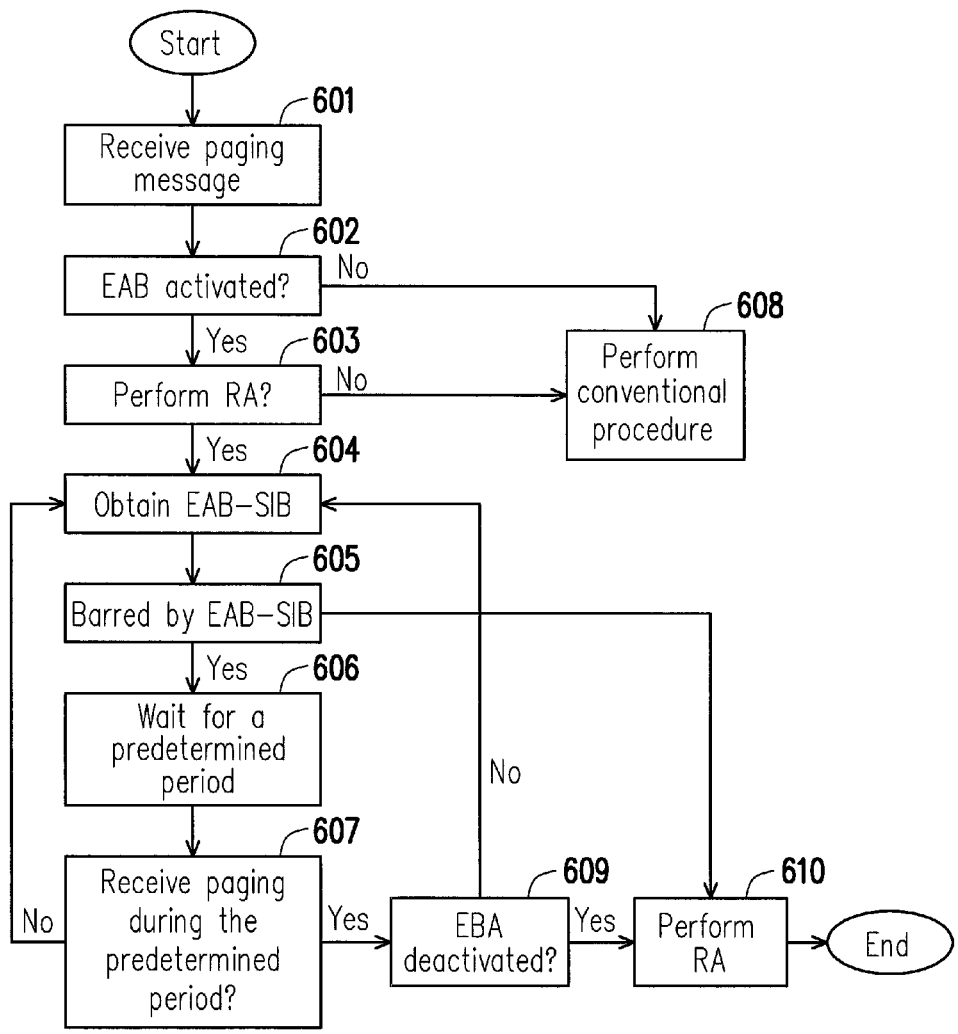
FIG. 6 illustrates the EAB procedure from the point of view of a MTC device according to the first exemplary embodiment.

FIG. 6 illustrates the flowchart of handling a paging message containing EAB status indication from the point of view of a MTC device for the first exemplary embodiment. First in 601, a MTC device receives a paging message. Next, in 602, the paged MTC would determine whether the EAB has been activated. If no, then the paged MTC device in 608 would perform the conventional access procedure according the LTE specification. If the page MTC learns that EAB has been activated in 602, but the MTC does not try to access the network, then the MTC still follows the conventional access procedure in 608 but postpones the acquisition of the EAB-SIB until it tries to access the network. However, if the MTC device tries to access the network in 603 (i.e. perform a random access procedure), it would first need to acquire the EAB-SIB in 604. After acquiring the EAB-SIB in 604, the MTC device in 605 would detect whether it is actually barred by the EAB or unaffected. If the MTC device is under the bar, the in 606 it would wait for a predetermined period before re-acquire the EAB-SIB in 606. After the predetermined period has elapsed, the MTC device in 607 would check if it has received another paging message during the predetermined period. If the MTC device has not received another paging message in 607, the MTC device would acquire the EAB-SIB in 604.

If the MTC device has received another paging message during the predetermined period in 607, then in 609 the MTC device would check if the EAB has been deactivated. If the EAB has been deactivated in 609 (e.g. EAB status bit=FALSE or 0), then in 610, the MTC device would access the network (i.e. perform a random access procedure) as the MTC device normally would. At this point, the EAB process has ended. However, the EAB is still active (e.g. EAB status bit=TRUE or 1), then the MTC device would acquire the EAB-SIB in 604. In this way, the MTC device does not acquire the EAB-SIB right away after receiving a paging message but postpones acquiring the EAB-SIB until it needs to access the network.

Figure 7:
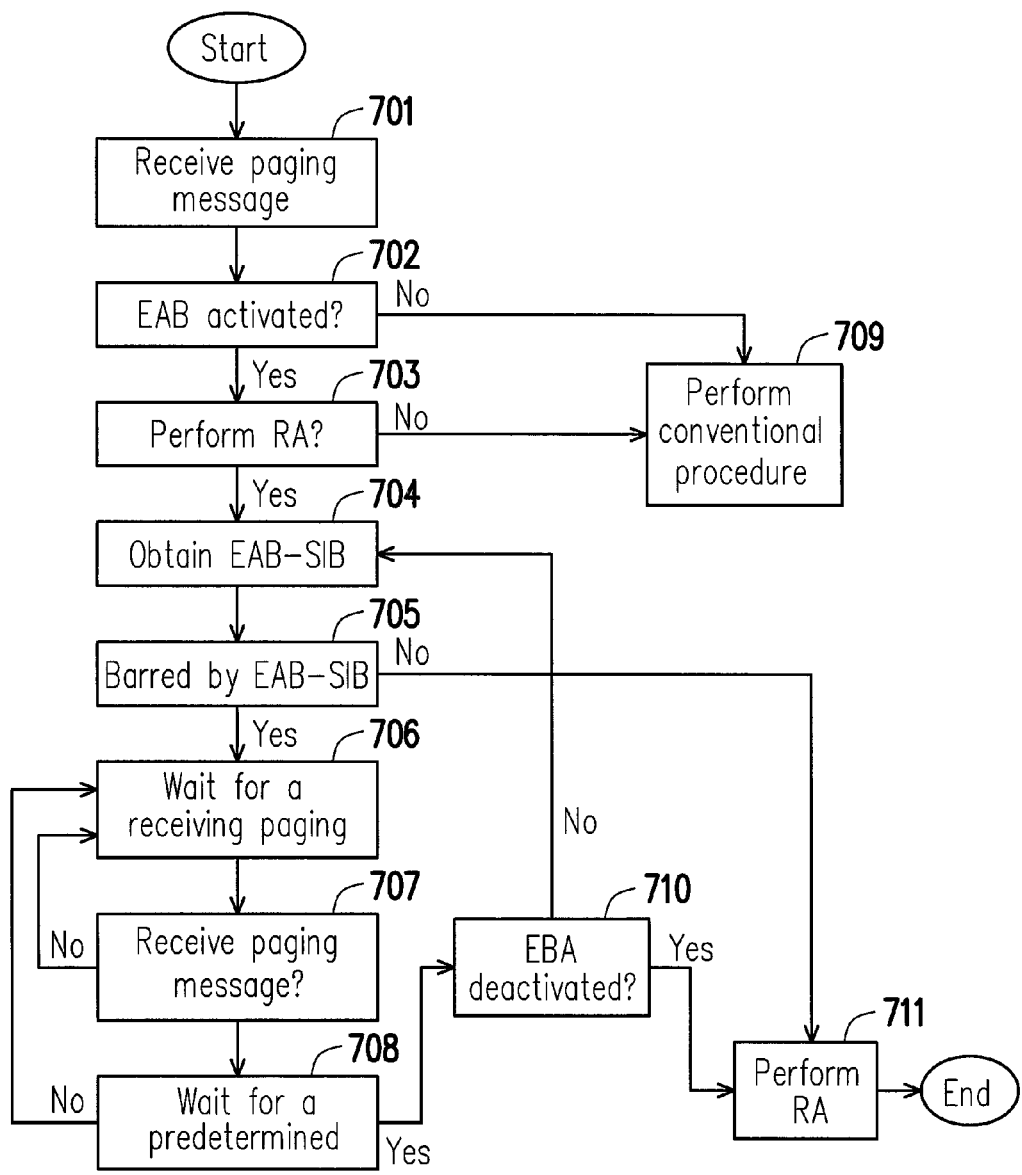
FIG. 7 illustrates the EAB procedure from the point of view of a MTC device according to the second exemplary embodiment.

FIG. 7 illustrates the flowchart of handling a paging message containing EAB status indication from the point of view of a MTC device for the second exemplary embodiment. First in 701, a MTC device receives a paging message. Next, in 702, the paged MTC would determine whether the EAB has been activated. If no, then the paged MTC device in 709 would perform the conventional access procedure according the LTE specification. If the page MTC learns that EAB has been activated in 702, but the MTC does not try to access the network, then the MTC still follows the conventional access procedure in 709 but postpones the acquisition of the EAB-SIB until it tries to access the network. However, if the MTC device tries to access the network in 703 (i.e. perform a random access procedure), it would first need to acquire the EAB-SIB in 704. After acquiring the EAB-SIB in 704, the MTC device in 705 would detect whether it is actually barred by the EAB or unaffected. If the MTC device is under the bar in 705, then in 706 it would wait for another paging message to arrive.

In 707, if the paging message has not arrived, the procedure would loop back to 706. If another paging message has arrived in 707, then in 708, the MTC device checks if the EAB parameter has changed from the paging message (i.e. by following the bit pattern as in FIG. 2B). If the EAB parameter has changed in 708, then it would check in 710 if the EAB has been deactivated. If the EAB has been deactivated in 710 (e.g. EAB status bit=00 as in FIG. 2B), then in 711, the MTC device would access the network (i.e. perform a random access procedure) as the MTC device normally would. At this point, the EAB process has ended. However, the EAB is still active (e.g. EAB status bit=01, 10, or 11), then the MTC device would acquire the EAB-SIB in 704. In this way, the MTC device does not acquire the EAB-SIB right away after receiving a paging message but postpones acquiring the EAB-SIB until it needs to access the network.

In Summary, a method and an apparatus for notifying activations of extended access barring (EAB) and updates of EAB information in the field of Long Term Evolution (LTE) wireless communication systems have been proposed. In view of the aforementioned descriptions, the eNB notifies MTC devices of EAB changes through the paging message. The network could use either a single bit EAB status indicator to notify whether the EAB has been enabled or disabled or use multiple bits EAB indicator to represent different EAB parameter changes. Based on the present disclosure, the network could reduce the paging overhead by require the MTC device to acquire the EAB-SIB only when it needs the EAB information.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for notifying parameter changes of an access control mechanism, adapted for a user equipment (UE) belonging to a specific access class, and the method comprising:
   receiving a paging message which contains an indicator indicating an access control mechanism is activated, wherein the access control mechanism bars at least one access classes;
   acquiring a parameter of the access control mechanism from a system information block to determine whether the specific access class is barred in response the access control mechanism being activated;
   performing a random access when the access class is not barred; and
   receiving another paging message which contains the indicator indicating the access control mechanism is disabled.

2. The method of claim 1, wherein the indicator indicates a first state and a second state wherein one of the first state and the second state indicates the activation of the access control mechanism, and the other one indicates the disablement of the access control mechanism.

3. The method of claim 1 further comprising:
   re-acquiring the parameter of the access control mechanism every a first predetermined period.

4. The method of claim 2, wherein the indicator further indicates additional states for whether an access control parameter has been changed.

5. The method of claim 4, wherein the indicator comprises at least two bits representing at least the first state, the second state, a third state, and a fourth state.

6. The method of claim 5, wherein one of the four access control states indicates the activation of access control mechanism, and the other three indicate the disablement of the access control mechanism.

7. The method of claim 5, wherein the other three states indicate a change in the access control parameter by changing the indicator from one of the other three states to another one of the other three states.

8. The method of claim 5 further comprising:
   obtaining the access control parameter after the indicator is changed from one of the other states to another one of the other three states.

9. The method of claim 1 further comprising:
   whenever a random access to the communication network is needed, acquiring the parameter of the access control mechanism to determine whether the UE is barred by the access control mechanism.

10. The method of claim 9 further comprising:
if the UE is barred by the access control mechanism,
waiting for a second predetermined period before re-acquiring the parameter of the access control mechanism; or
re-acquiring the parameter of the access control mechanism when the indicator indicating the access control parameter has been changed.

11. A user equipment (UE) belonging to a specific access class, comprising:
a transceiver for transmitting and receiving wireless signals;
a processor coupled to the transceiver and configured for:
receiving a paging message which comprises an indicator indicating whether an access control mechanism which bars at least one access class is activated or disabled; in response to receiving the paging message comprising the indicator indicating that the access control mechanism is activated, acquiring a parameter of the access control mechanism from a system information block to determine whether the specific access class is barred; performing a random access when the access class is not barred; and receiving another paging message which comprises the indicator indicating that the access control mechanism is disabled.

12. The UE of claim 11, wherein the indicator consists of a first state and a second state wherein one of the first state and the second state indicates the activation of the access control mechanism, and the other one indicates the disablement of the access control mechanism.

13. The UE of claim 11 further comprising:
re-acquiring the access control parameter every a first predetermined period.

14. The UE of claim 11, wherein the indicator further indicates whether an access control parameter has been changed.

15. The UE of claim 14, wherein the indicator comprises at least two bits representing four different access control states.

16. The UE of claim 15, wherein one of the four access control states indicates the activation of access control mechanism, and the other three indicate the disablement of the access control mechanism.

17. The UE of claim 16, wherein the other three states indicate a change in the access control parameter by changing the indicator from one of the other three states to another one of the other three states.

18. The UE of claim 11, wherein the processor is further configured for:
whenever a random access to the wireless communication network is needed,
acquiring the parameter of the access control mechanism to determine whether the UE is barred by the access control mechanism.

19. The UE of claim 18, wherein the processor further configured for:
if the UE is barred by the access control mechanism, waiting for a second predetermined period before re-acquiring the parameter of the access control mechanism; or
re-acquiring the parameter of the access control mechanism when the indicator indicating the access control parameter has been changed.

* * * * *